United States Patent [19]

Jonason

[11] Patent Number: 4,655,733
[45] Date of Patent: Apr. 7, 1987

[54] ARRANGEMENT FOR TRANSMITTING TORQUE BETWEEN CONICAL PULLEYS IN A TRANSMISSION MECHANISM

[75] Inventor: Arne Jonason, Angered, Sweden
[73] Assignee: AB Volvo, Gothenburg, Sweden
[21] Appl. No.: 783,439
[22] Filed: Oct. 3, 1985
[30] Foreign Application Priority Data
 Oct. 3, 1984 [SE] Sweden .................................. 8404954
[51] Int. Cl.$^4$ .............................................. F16H 7/00
[52] U.S. Cl. ...................................... 474/242; 474/85; 474/206; 474/251
[58] Field of Search ................... 474/85, 242, 244, 245, 474/251, 206

[56] References Cited

U.S. PATENT DOCUMENTS

3,965,764 6/1976 Avramidis .............................. 474/85
4,524,654 6/1985 Lucey .................................. 474/85 X

FOREIGN PATENT DOCUMENTS

466442 10/1951 Italy ....................................... 474/84

Primary Examiner—James A. Leppink
Assistant Examiner—Hoang C. Dang
Attorney, Agent, or Firm—Young & Thompson

[57] ABSTRACT

The invention relates to an arrangement for transmitting torque between conical pulleys in a transmission mechanism. The invention is characterized in that the arrangement includes a first endless, flexible element (v-belt, chain or flat belt) for taking-up clamping forces and a corresponding second element for power transmission between the pulleys. The second element extends around the first element and is provided with devices which are in shape-bound engagement with co-acting devices on the first flexible element, the arc of contact ($\alpha$) of which around the pulleys is greater than the arc of contact ($\beta$) of the elements when in engagement together.

10 Claims, 11 Drawing Figures

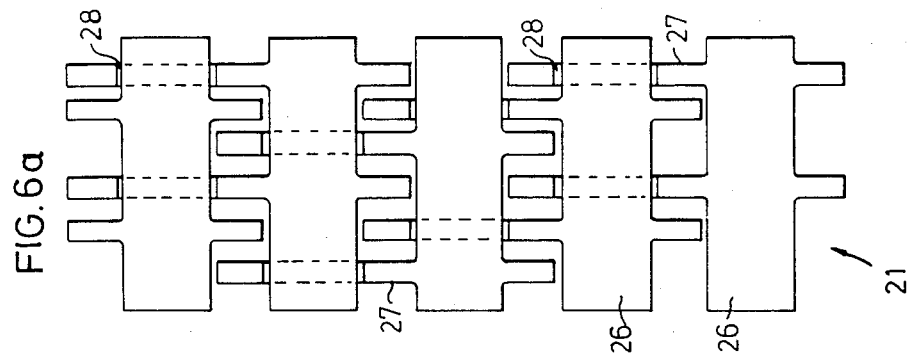
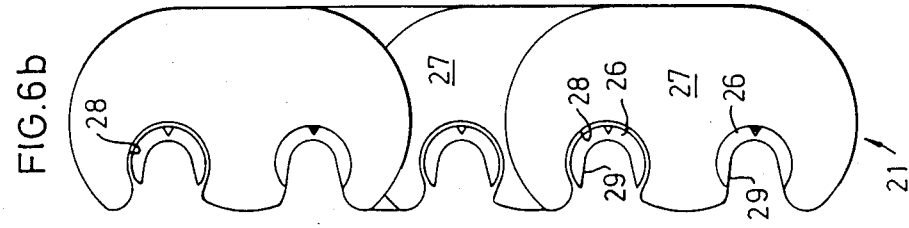
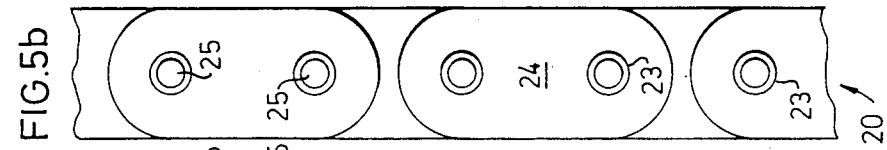
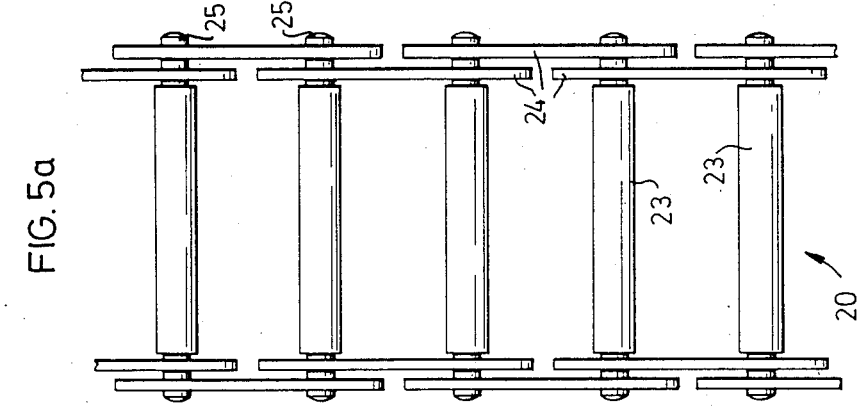

ARRANGEMENT FOR TRANSMITTING TORQUE BETWEEN CONICAL PULLEYS IN A TRANSMISSION MECHANISM

The present invention relates to an arrangement for transmitting torque between conical pulleys forming part of a transmission mechanism, the arrangement including an endless flexible element which extends between the pulleys and has contact surfaces intended to frictionally engage the conical side surfaces of said pulleys.

In automobile transmission mechanism in particular, incorporating continuously variable speed transmission, so-called variators, for high-power engines, extremely large clamping forces are required between the side surfaces of the pulleys and the flexible element, a v-belt, chain or flat belt, the torque being transmitted solely through friction between the sides of the pulleys and the v-belt, chain or flat belt. As a result hereof, the pre-tension or initial tension must also be high. In the entry and exit zones of the flexible element to and from the pulleys, the contact surface of said flexible element turns in relation to the facing pulley-surface while absorbing power at the same time. This results in power losses and wear, which become greater with greater clamping forces and greater initial tension in the flexible element.

When using chains in variators, various attempts have been made to convert sliding motion into rolling motion, in order to reduce frictional losses and wear. One example of this is described in Swedish Patent Application No. 8103600-6. In order to obtain the smallest possible sliding motion between pins and pulley-sides and links respectively, the pins in this case comprise mutually abutting asymmetrical halves between which rolling motion takes place when the chain wraps around the pulleys. The pins are guided in a manner which imparts a given setting thereto as they pass into engagement with the pulleys. This means in theory that the length of the whole end surface of respective pins can be used as an engagement surface for a given engagement radius on the pulley. Only punctiform engagement is obtained, however, for all other engagement radii. Furthermore, since it is impossible to avoid a certain amount of sliding motion between the ends of the pins and the sides of the pulleys, the amount of wear obtained is still large.

The object of the present invention is to provide an arrangement of the kind described in the introduction with which the problem relating to power losses and wear is solved in a more effective manner than has hitherto been the case.

This object is achieved in accordance with the invention by means of an arrangement of the aforesaid kind which in addition to the aforesaid flexible element (v-belt, chain or flat belt) also includes a second endless flexible element which extends between the pulleys and surrounds the first flexible element, and which has provided in uniform spaced relationship on its inner surface a plurality of engagement elements which are in shape-bound engagement with co-acting engagement elements on the first flexible element, the length of the first flexible element being greater than the length of the second flexible element, so that it can be given a greater arc of contact with the pulleys.

In the arrangement according to the invention, the first flexible element mainly serves as a clamping-force absorbing component, while the second flexible element mainly serves as a component for transmitting power between the pulleys. Thus, the first flexible element can run substantially without transmitting power in its free-running parts. Consequently, at the entry and exit zones of the first flexible element to and from the pulleys, this element will become clamped between the pulley sides without any appreciable power transmission. At the engagement and disengagement zones of the second flexible element with the first flexible element, the clamping surfaces of the latter element are already fitted between the sides of the respective pulley, which limits the relative movement between the clamped surfaces and the pulley sides to low values with subsequent low wear.

The invention will now be described in more detail with reference to embodiments illustrated in the accompanying drawings, in which FIG. 1 is a longitudinal sectional view through a first embodiment of the arrangement according to the invention;

FIGS. 5a and 5b are respectively a plan view and a side view of the clamping-force absorbing chain in FIG. 4;

FIGS. 6a and 6b are respectively a plan view and a side view of the traction-force transmission chain in FIG. 4.

Figure 1:
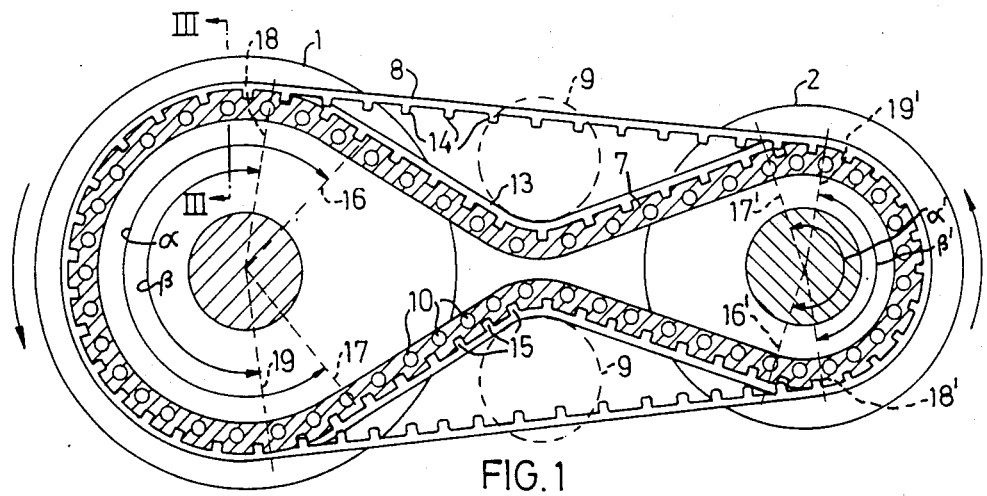
Figure 2:
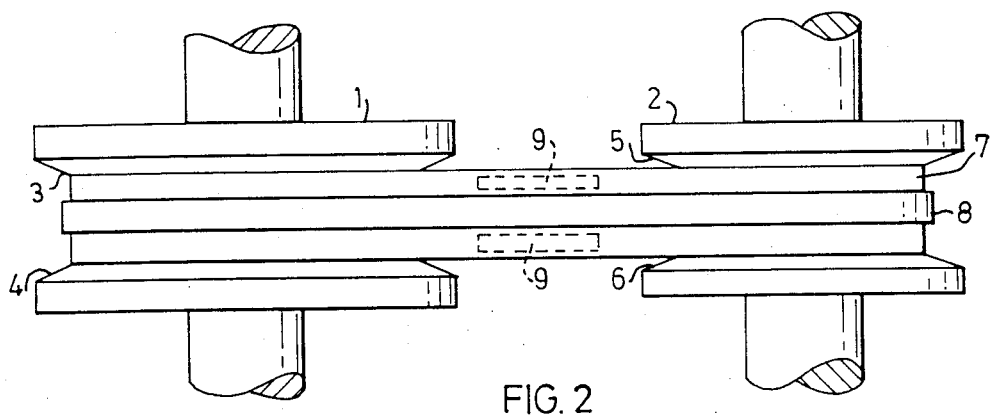
FIG. 2 is a view from above of the arrangement illustrated in FIG. 1.

In FIGS. 1 and 2 the reference 1 and 2 identify a pair of conical transmission pulleys, of which one is a driving pulley and the other is driven. The pulleys 1,2 may be of a known kind and the sides 3,4 and 5,6 of the respective pulleys are capable of being moved towards and away from each other, in order to vary the transmission gearing.

Extending between the pulleys 1,2 is a first endless, flexible element 7 in the form of a v-belt. Arranged outwardly of the v-belt 7 is a second endless, flexible element 8 in the form of a further belt. The v-belt 7 is longer than the belt 8 and is adjusted with regard to slack by means of two pairs of tensioning or belt-tightening rollers 9. Respective pairs of rollers 9 are spring biassed towards the v-belt 7 in a manner not shown in more detail here, so that the v-belt is held slightly tensioned and wraps around a respective pulley 1,2 through an arc of contact of $\alpha$ and $\alpha'$ respectively, this angle being greater than the arc of contact $\beta$ and $\beta'$ of the v-belt 7 and the further belt 8 when engaged together. Embedded in the v-belt 7 are transverse rods 10, the ends 11 of which project beyond the side surfaces of the belt.

The end surfaces 12 of the rods 10 are at least substantially parallel to the sides 3,4 and 5,6 of respective pulleys and form contact surfaces against said sides.

The v-belt 7 is provided on its outwardly facing side with a longitudinally extending groove 13 the cross-sectional shape of which corresponds to that of the further belt 8 and in which said belt is laterally guided. Shape-bound engagement between the v-belt 7 and the further belt 8 for the transmission of traction-force is obtained with the aid of teeth 14 provided on the inner surface of the belt, these teeth engaging in tooth cavities 15 in the bottom of the groove 13.

The described embodiment affords the advantage that the entry zones 16,16' and the exit zones 17,17' of the v-belt 7 lie inwardly of the entry zones 18,18' and the exit zones 19,19' of the further belt 8, which means that the rods 10 on the v-belt 7 are securely lodged inbetween the sides of respective pulleys when passing through the entry and exit zones for the belt 8. As a result there is but small relative movement between the contact surfaces 12 of the rods 10 and the sides 3,4 and 5,6 of respective pulleys.

Figure 4:
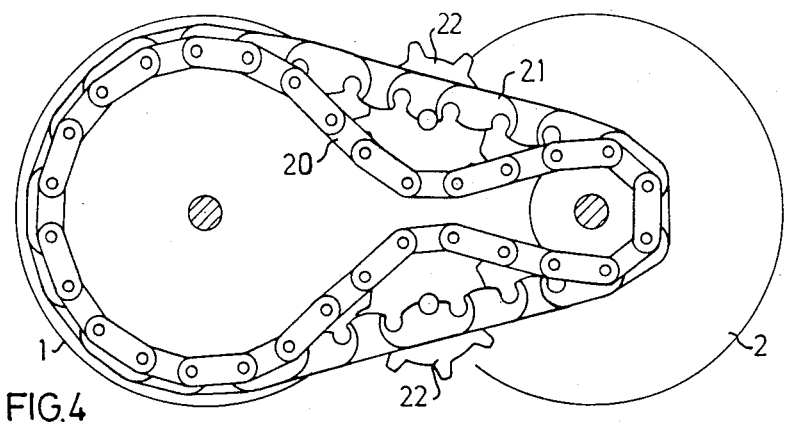
FIG. 4 is a side view of a second embodiment according to the invention.

FIGS. 4-6 illustrate an embodiment in which the belts 7,8 of the previous embodiment have been replaced with chains 20 and 21, and the tensioning rollers 9 with pairs of sprockets 22, which, similar to the rollers 9, are spring biassed to take up slack, as illustrated in FIG. 4.

FIGS. 5a and 5b illustrate the clamping-force absorbing chain 20, which is constructed in a conventional manner from pivot pins 23 and links 24. The pins 23 have conical end surfaces 25 which form contact surfaces for contact with the sides of respective pulleys and which due to their rotationally symmetric shape can be permitted to rotate during operation.

As illustrated in FIGS. 6a and 6b, the traction-force transmission chain 21 is of a more particular kind. Each pin 26 is firmly connected to a pair of link plates 27, each of which presents a respective circular-arcuate recess 28 through which an adjacent pin 26 extends. The spacing between mutually adjacent pins 26 in the chain 21 is the same as that of the pins 23 in the chain 20 and each pin 26 is provided with a groove 29 of U-shaped cross-section conforming to the cross-sectional shape of the pins 23. The shape-bound engagement for the transmission of power between the pulleys 1,2 is thus achieved with this embodiment through engagement between the pins 23,26 of respective chains 20,21, wherewith the firm connection between respective pins 26 and a pair of link plates 27 ensures that the grooves 29 of respective pins always lie correctly in relation to the co-acting pins 23 on the chain 20.

Figure 7:
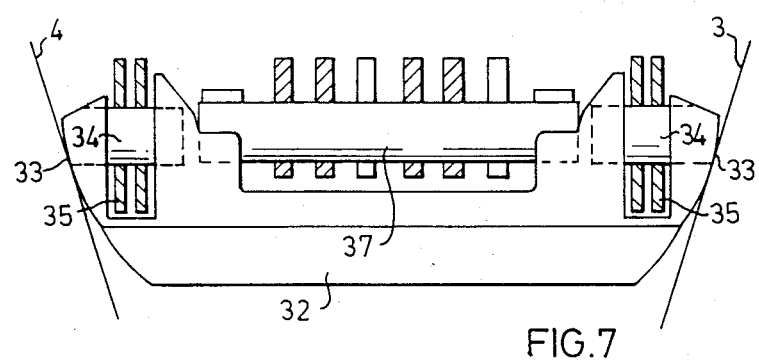
FIG. 7 is a cross-sectional view of a third embodiment of the arrangement according to the invention.
Figure 8:
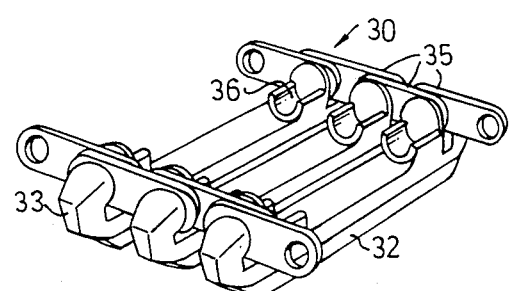
FIG. 8 is a perspective view of part of the clamping-force absorbing chain in FIG. 7.
Figure 9:
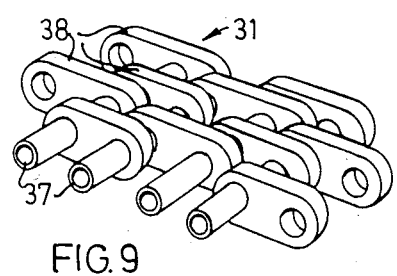
FIG. 9 is a perspective view of part of the traction-force transmission chain in FIG. 7.

FIGS. 7-9 illustrate an embodiment which includes a clamping-force absorbing chain 30 and a traction-force transmission chain 31. The clamping-force absorption chain 30 differs from the corresponding chain 20 of the previous embodiment insomuch that the cylindrical pivot pins are replaced with particularly formed clamping bodies 32 having substantially planar end surfaces 33 which extend parallel to the inner surfaces of the sides 3,4 and 5,6 of respective pulleys 1,2. The clamping bodies 32 of the chain 30 are mutually connected by means of links 35 journalled on journal pins 34 and are provided axially inwards of the pins 34 with U-shaped recesses 36 in which the pivot pins 37 of the traction-force transmission chain 31 engage, as illustrated in FIG. 7. The pivot pins 37 of the chain 31 are connected together in a known manner by means of links 38 in a manner to obtain a so-called tripartite-pitch chain, as illustrated in FIG. 9. The pivot pins 37 of the chain 31 are hollow, in order to reduce the mass of the chain.

Figure 3:
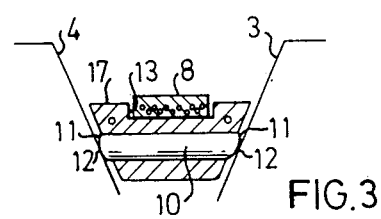
FIG. 3 is a cross-sectional view taken on the line III—III in FIG. 1.

Additional embodiments are conceivable within the scope of the invention. For example, in certain applications the rods 10 of the embodiment according to FIGS. 1-3 may be replaced with a transversally stiftening reinforcement, the side surfaces of the v-belt forming contact surfaces against the sides of respective pulleys in a known manner. Slide shoes or like guide means may be used to control slack instead of the aforesaid tensioning rollers 9 and sprocket wheels 22. In the case of transmissions which are intended to work in only one direction, the whole of the slack may be taken up by one free-running part instead of being divided equally between both parts as with the aforedescribed embodiments.

I claim:

1. An arrangement for transmitting torque between conical pulleys in a transmission mechanism, including an endless first flexible element which extends between the pulleys and which is provided with contact surfaces intended for frictional engagement with conical side surfaces of the pulleys, and a second endless flexible element which extends between the pulleys and surrounds the first flexible element and which is provided on an inner surface thereof with uniformly distributed engagement elements which are in shape-bound engagement with co-acting engagement elements on the first flexible element, the first flexible element having a greater length than the second flexible element so that said first element can be given a greater arc of contact ($\alpha$) around the pulleys than the arc of contact ($\beta$) of the second flexible element, the first flexible element comprising a V-belt having located in uniformed space relationship on an outer surface thereof a plurality of toothed cavities; the second flexible element being a belt having in the inner surface thereof teeth which conform to the tooth cavities of the first flexible element; and transverse metal rods inserted in uniform spaced relationship in the V-belt and having externally of the side surfaces of said belt end whose end surfaces form contact surfaces for contact with the conical surfaces of respective pulleys.

2. An arrangement for transmitting torque between conical pulleys in a transmission mechanism, including an endless first flexible element which extends between the pulleys and which is provided with contact surfaces intended for frictional engagement with conical side surfaces of the pulleys, and a second endless flexible element which extends between the pulleys and surrounds the first flexible element and which is provided on an inner surface thereof with uniformly distributed engagement elements which are in shape-bound engagement with co-acting engagement elements on the first flexible element, the first flexible element having a greater length than the second flexible element so that said first element can be given a greater arc of contact ($\alpha$) around the pulleys than the arc of contact ($\beta$) of the second flexible element, the flexible elements having the form of chains.

3. An arrangement according to claim 2, characterized in that the one chain has cylindrical pivot pins and the other chain has pivot elements provided with U-shaped recesses for engagement with the cylindrical pivot pins.

4. An arrangement according to claim 3, characterized in that the cylindrical pivot pins are provided with conical end surfaces which form contact surfaces with the side surfaces of respective conical pulleys.

5. An arrangement according to claim 3, characterized in that said pivot elements form clamping bodies for engagement with the side surfaces of respective conical pulleys, wherewith the opposing end surfaces of the clamping bodies form substantially planar, inclined surfaces which form with one another an angle which is substantially equal to the angle subtended by the mutually opposite side surfaces of respective pulleys.

6. An arrangement for transmitting torque between a first and a second pulley in a transmission mechanism, including an endless first flexible element which extends between said first and second pulley and which is provided with contact surfaces intended for frictional engagement with opposite conical side surfaces of each pulley, characterized by a second endless flexible element which extends between said first and second pulley and surrounds the first flexible element, and which is provided on an inner surface thereof with uniformly distributed engagement elements which are in shape-bound engagement with co-acting engagement elements on the first flexible element, the first flexible element having a greater length than the second flexible element, and means imparting to said first element a greater arc of contact ($\alpha$) around the pulleys than the arc of contact ($\beta$) of the second flexible element.

7. An arrangement according to claim 6, and tensioning means for taking slack in said first element.

8. An arrangement according to claim 6, in which the first flexible element is a V-belt having located in uniform spaced relationship on an outer surface thereof a plurality of tooth cavities; the second flexible element being a belt having in the inner surface thereof teeth which conform to the tooth cavities on the first flexible element.

9. An arrangement according to claim 8, in which the first flexible element has a longitudinally extending groove having a cross-sectional shape which conforms to the cross-sectional shape of the second flexible element, said tooth cavities being formed in the bottom of the groove.

10. An arrangement according to claim 6, in which said engagement elements extend transversely of the length of said flexible elements.

* * * * *